United States Patent [19]

Ataman et al.

[11] Patent Number: 4,613,986
[45] Date of Patent: Sep. 23, 1986

[54] DIGITAL FILTER FOR ENHANCEMENT OF DOCUMENT IMAGES

[75] Inventors: Ergin Ataman, Istanbul, Turkey; J. Thomas King, Waterloo, Canada

[73] Assignee: NCR Canada Ltd—NCR Canada Ltee, Mississauga, Canada

[21] Appl. No.: 620,660

[22] Filed: Jun. 14, 1984

[51] Int. Cl.⁴ ............................................... G06K 9/40
[52] U.S. Cl. ...................................... 382/54; 358/284; 382/27; 382/31
[58] Field of Search ...................... 382/54, 50, 52, 56, 382/27, 7, 51, 31; 358/282, 284, 260

[56] References Cited

U.S. PATENT DOCUMENTS

| | | | |
|---|---|---|---|
| 3,805,239 | 4/1974 | Watanabe | 382/51 |
| 3,973,239 | 8/1976 | Kakumoto et al. | 382/50 |
| 4,003,024 | 1/1977 | Riganati | 382/54 |
| 4,389,677 | 6/1983 | Rushby et al. | 358/284 |
| 4,399,461 | 8/1983 | Powell | 382/54 |
| 4,443,855 | 4/1984 | Bishop et al. | 382/54 |
| 4,491,964 | 1/1985 | Sanner | 382/54 |
| 4,550,437 | 10/1985 | Kobayashi et al. | 382/27 |

Primary Examiner—Leo H. Boudreau
Assistant Examiner—Joseph Mancuso
Attorney, Agent, or Firm—J. T. Cavender; Edward Dugas; Floyd A. Gonzalez

[57] ABSTRACT

An apparatus and method for scanning a document image in an m×n matrix. The device includes a sensing array for sequentially sensing along a scan line, elements along one dimension of the matrix, registers for sequentially storing sensed elements for a selected number of scan lines, and a circuit for effecting a scan line delay between sequential scan lines. Registers are also provided for effecting an element delay in all of the stored scanned lines along the other dimension of the matrix wherein the element delay is responsive to a sequential sensing of a matrix element. Selected matrix elements are combined with selected weighting factors for enhancing the document image being scanned.

3 Claims, 29 Drawing Figures

FIG. 6

| $A_0$ | $B_0$ | $C_0$ | $D_0$ | $E_0$ |
|---|---|---|---|---|
| $A_1$ | $B_1$ | $C_1$ | $D_1$ | $E_1$ |
| $A_2$ | $B_2$ | $C_2$ | $D_2$ | $E_2$ |
| $A_3$ | $B_3$ | $C_3$ | $D_3$ | $E_3$ |
| $A_4$ | $B_4$ | $C_4$ | $D_4$ | $E_4$ |

FIG. 7

| 0 | -1 | -2 | -1 | 0 |
|---|---|---|---|---|
| -1 | 1 | 2 | 1 | -1 |
| -2 | 4 | 16 | 4 | -2 |
| -1 | 1 | 2 | 1 | -1 |
| 0 | -1 | -2 | -1 | 0 |

FIG. 8A

| A | B | C | D | E | |
|---|---|---|---|---|---|
|  | $-B_0$ | $-2C_0$ | $-D_0$ |  | 0 |
| $-A_1$ | $B_1$ | $2C_1$ | $D_1$ | $-E_1$ | 1 |
| $-2A_2$ | $4B_2$ | $16C_2$ | $4D_2$ | $-2E_2$ | 2 |
| $-A_3$ | $B_3$ | $2C_3$ | $D_3$ | $-E_3$ | 3 |
|  | $-B_4$ | $-2C_4$ | $-D_4$ |  | 4 |

FIG. 8B

| | B | C | D |
|---|---|---|---|
| (-1)X | $B_0$ | $2C_0$ | $D_0$ |
| (1)X | $B_1$ | $2C_1$ | $D_1$ |
| (4)X | $B_2$ | $4C_2$ | $D_2$ |
| (1)X | $B_3$ | $2C_3$ | $D_3$ |
| (-1)X | $B_4$ | $2C_4$ | $D_4$ |

| | A | E | |
|---|---|---|---|
| (-1)X | $A_1$ | $E_1$ | 1 |
| (-2)X | $A_2$ | $E_2$ | 2 |
| (-1)X | $A_3$ | $E_3$ | 3 |

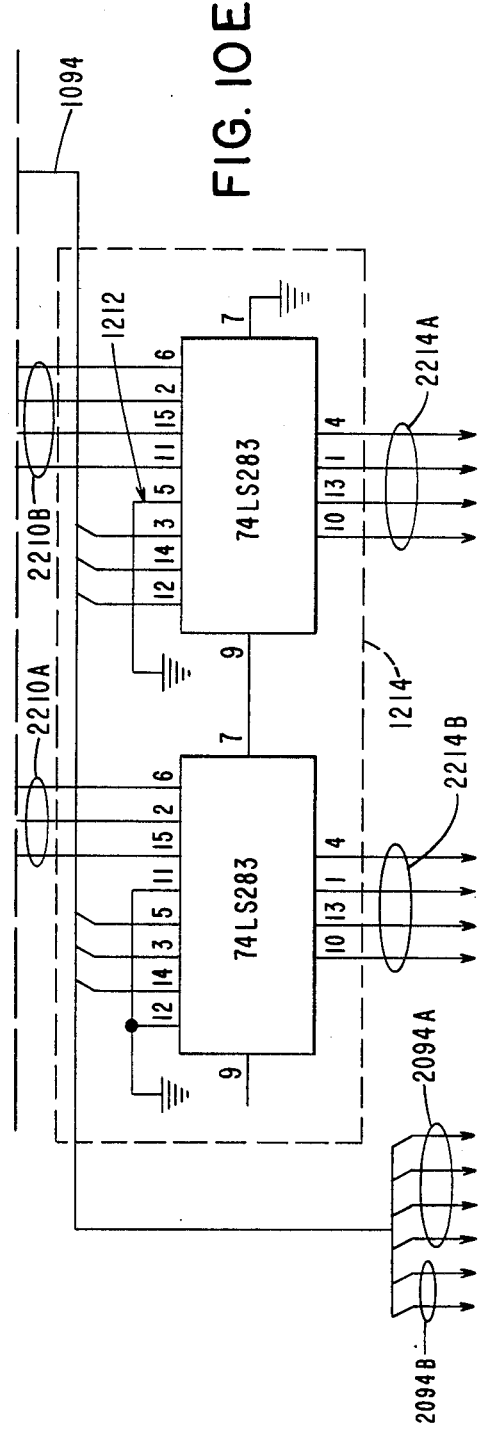
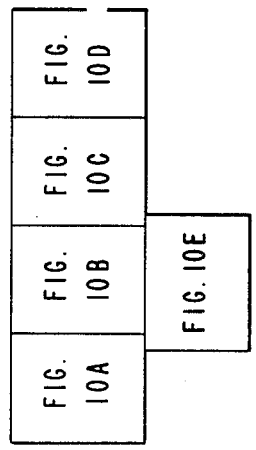

DIGITAL FILTER FOR ENHANCEMENT OF DOCUMENT IMAGES

BACKGROUND OF THE INVENTION

The present invention relates generally to a method and apparatus for processing digital images, and in particular, to a method and apparatus for enhancing digital images from documents containing background scenes or other spurious images which tend to obscure or confuse the proper discernment of the desired images.

In document processing systems, it is desirable to enhance certain information on the document images which generally consists of hand- or machine-printed characters. As characters are made of thin lines, a filter which enhances these lines over background scenes or other spurious images, improves the quality of the document images and assists in discerning the content of the images for proper storing and processing by computer.

U.S. Pat. No. 3,973,239 issued Aug. 3, 1976 to Kakumoto et al discloses a pattern processing system wherein portions of an image detected by a pickup tube is stored in a matrix. A brute force type of multiplication is performed wherein a separate multiplier is used to multiply each element of the data containing matrix by a single element of a filter matrix, and the results summed by an adder. Thus an m×n matrix requires m×n multipliers. Also, the apparatus disclosed therein contains shift registers which shift downwardly in sequence until the value being shifted downwardly reaches the bottom of the data window, and thereafter the value is moved to the top of the immediately right column. This procedure is followed for all of the columns until the data matrix is filled.

U.S. Pat. No. 3,889,234 issued June 10, 1975 to Makihara et al discloses a feature extractor in which a series of bits representing an image is simultaneously shifted in a right shift register. In the disclosed device, all of the data is first set up in registers and then addressed.

Other examples of character enhancement and pattern discerning apparatus are disclosed in the following: U.S. Pat. No. 3,737,855 issued June 5, 1973 to Cutaia; U.S. Pat. No. 3,805,239 issued Apr. 16, 1974 to Watanabe; U.S. Pat. No. 4,047,152 issued Sept. 6, 1977 to Giuliano et al; U.S. Pat. No. 4,052,699 issued Oct. 4, 1977 to Micka et al; U.S. Pat. No. 4,162,481 issued July 24, 1979 to DuVall; and U.S. Pat. No. 4,266,249 issued May 5, 1981 to Chai et al.

Many sensors used with optical detection systems severely attenuate higher frequencies. Hence, most of the image energy at higher frequencies is due to noise introduced by the imaging system. When documents are scanned vertically, low frequency noise in the vertical direction appears as very high frequency noise in the horizontal direction. It is therefore desirable that higher frequencies, especially in the horizontal direction, be attenuated by a filter. This filter should also be capable of enhancing lines that are approximately two pixels thick. It has been found that black and white line pairs of two pixels thick are one dimensional spatial square waves with the fundamental frequency equal to $F_s/4$, where $F_s$ is the sampling frequency of the image. Hence, the filter should amplify frequencies approximately equal to $F_s/4$. It has also been found that the highest frequencies in the image sensed by scanning in a vertical direction correspond to $F_s/2$. Hence, sinusoids with the approximate frequency of $F_s/2$ should also be attenuated.

SUMMARY OF THE INVENTION

The present invention provides a digital filter circuit for use with an optical scanning system which moves a window over the image on a document being scanned wherein the window is moved one row downwardly with each picture element that is sensed from the document. A filter circuit is also provided which, because of its simplicity, provides for easy hardware implementation. Also, the coefficients of the numerical filter are powers of two, providing that all multiplication operations are achieved by shift operations. The numerical filter circuit disclosed herein provides that sinusoids with the approximate frequency of $F_s/4$ are amplified about 1.5 and about 1.7 times in the horizontal and vertical directions respectively. Further, attenuation of sinusoids with the approximate frequency of $F_s/2$ is about 95% in the horizontal direction and about 45% in the vertical direction.

It is therefore an object of the present invention to provide an enhancement circuit which enhances a two-dimensional array of picture elements of a document being scanned with a minimum of multiplier and adder circuits.

It is a further object to provide an enhancement circuit which effects a scan line delay between the scan lines of a data window.

It is a further object to move the data window down one row with the sequential reading of a new picture element value.

It is a further object to apply a filter matrix to the picture element values in the data window which amplifies sinusoids with the approximate frequency of $F_s/4$ in the horizontal and vertical directions, and attenuate sinusoids with the approximate frequency of $F_s/2$ in the horizontal and vertical directions.

It is a further object to effect multiplication of values of the picture elements of the data window by elements of the filter matrix by shifting the data bits of the data window elements.

In one preferred embodiment, an apparatus and method is provided for scanning a document image in an m×n matrix. The device includes a sensing array for sequentially sensing along a scan line, elements along one dimension of the matrix, registers for sequentially storing sensed elements for a selected number of scan lines, and a circuit for effecting a scan line delay between sequential scan lines. Registers are also provided for effecting an element delay in all of the stored scanned lines along the other dimension of the matrix wherein the element delay is responsive to a sequential sensing of a matrix element. Selected matrix elements are combined with selected weighting factors for enhancing the document image being scanned.

BRIEF DESCRIPTION OF THE DRAWINGS

FIG. 6 is a diagrammatic illustration of the matrix of the picture element values read by the system of FIG. 1 showing the row and column nomenclature thereof;

FIG. 7 is a diagrammatic illustration of the weighting values or coefficients of the numeric filter of the present invention;

FIGS. 8A–8C are a graphical representation of the calculations performed by the numeric filter of the present invention;

FIGS. 10A–10E, arranged as shown to FIG. 10, is a partial schematic diagram of the circuit illustrated in FIG. 9;

DESCRIPTION OF THE PREFERRED EMBODIMENT

Figure 1:
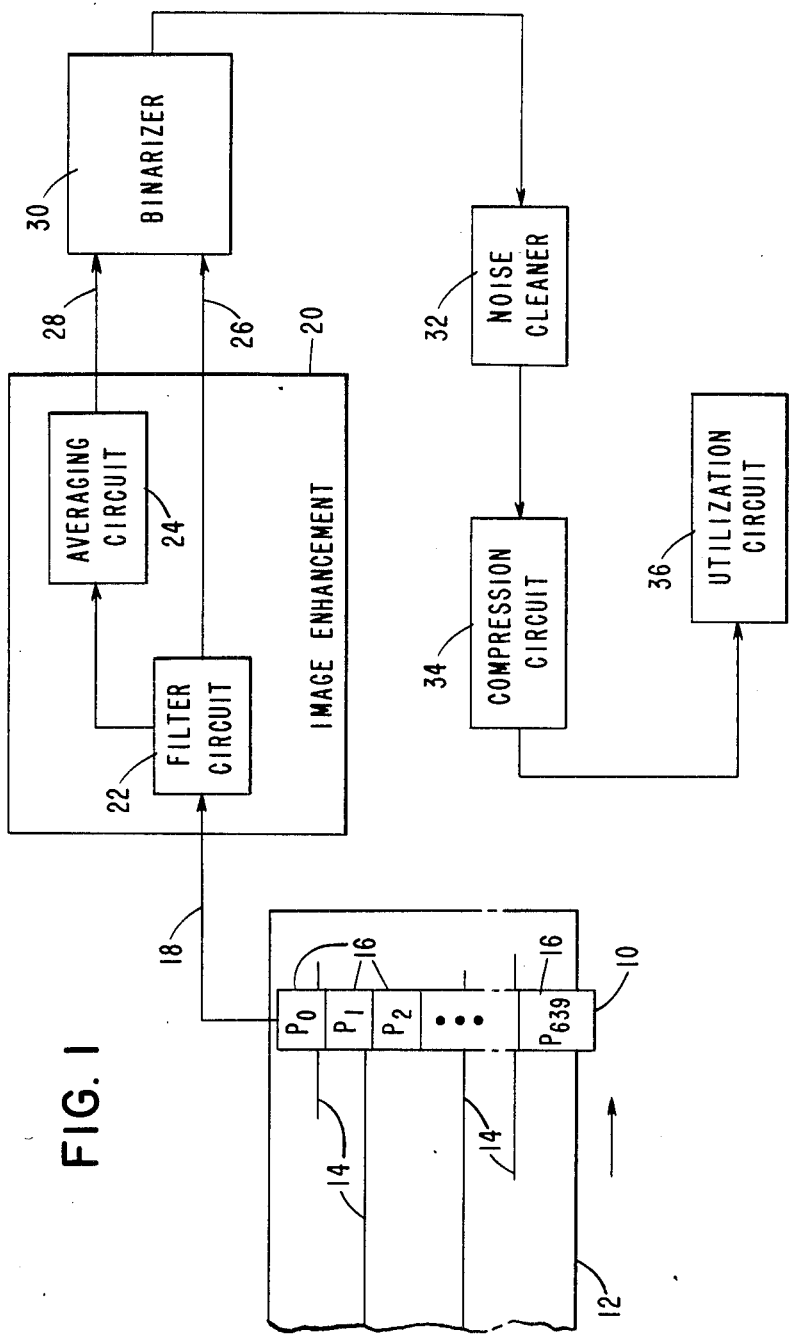
FIG. 1 is a block diagram illustrating a document reading system utilizing the present invention.

FIG. 1 is a block diagram illustrating a document reading system utilizing the present invention. The document reading system reads a document such as a check from a banking institution for storage and processing in a computer. The document contains certain legal information including the check number, the amount of the check, the date on which the check is written, and the signature of the writer which must be analyzed and discerned for storage in the computer memory for proper processing of the check. Many checks contain background scenes or other spurious images such as ink spatters, stains, or other marks which tend to obscure or confuse the proper discernment of the mentioned legal information recorded on the check.

The system of FIG. 1 includes a sensor array 10 which scans in a vertical direction along one dimension of the check 12. As is known, the sensor array 10 includes a number of sensors 16 for sensing the gray levels of small areas of the document referred to as picture elements or pixels. In the preferred embodiment, the sensor array 10 is divided into 640 sensing elements, numbered from 0 through 639, for reading the pixels of the document. In the preferred embodiment, the sensing elements 16 are scanned from top to bottom, and gray values for the sensing elements 16 are transmitted, in turn, over a data bus 18 from the sensing array 10 to the circuits of the system to be described. The gray levels of the preferred embodiment may have one of 64 values ranging from 0 to 63, with 0 being the darkest and 63 being the lightest.

The gray levels on the data bus 18 are fed from the sensor array 10 to an image enhancement circuit 20 where the gray levels are enhanced in such a manner that the background scene and other spurious marks are attenuated. The image enhancement circuit 20 contains a filter circuit 22 for performing the image enhancement function, and an averaging circuit 24 for determining the average gray level of a 3×3 pixel window around the pixel being enhanced. The output of the filter circuit 22 and the output of the averaging circuit 24 are connected to a binarizer circuit 30 by data buses 26 and 28 respectively.

The binarizer circuit 30 converts the 64 values of gray levels of the pixel being enhanced from 6 bits per pixel to a 1 bit per pixel binary signal. Any of a number of binarizing schemes and circuits may be employed, as is well known in the art.

The binary output of the binarizer circuit 30 is then processed by a conventional noise cleaner circuit 32, a compression circuit 34, and a utilization circuit 36 which may, for example, be banking or accounting apparatus for storing and processing the legal information from the document 12.

The digital filter circuit 22 of FIG. 1 applies a 5×5 two-dimensional digital filter having the coefficients:

$$1/16 \begin{bmatrix} 0 & -1 & -2 & -1 & 0 \\ -1 & 1 & 2 & 1 & -1 \\ -2 & 4 & 16 & 4 & -2 \\ -1 & 1 & 2 & 1 & -1 \\ 0 & -1 & -2 & -1 & 0 \end{bmatrix}$$

To apply the digital filter described, the filter circuit 22 operates on a 5×5 matrix of gray level data from data bus 18 in accordance with the following equation:

$$R(i,j) = \sum_{k=\alpha_1}^{\beta_1} \sum_{\lambda=\alpha_2}^{\beta_2} W(k,l)D(i+k, j+l) \qquad \text{Equation 1}$$

where

R = enhanced document image elements,
W = weighting values,
D = original document image elements, and
$\alpha_1, \alpha_2, \beta_1,$ and $\beta_2$ are defined.

In the present embodiment wherein a 5×5 matrix is operated on by the digital filter, the matrix dimensions vary from 0 to 4, and the element being enhanced is the center element $R(2,2)$ of the matrix. In this case, the values of $\alpha_1$ and $\alpha_2$ are 0, and the values of $\beta_1$ and $\beta_2$ are 4.

Figure 2:
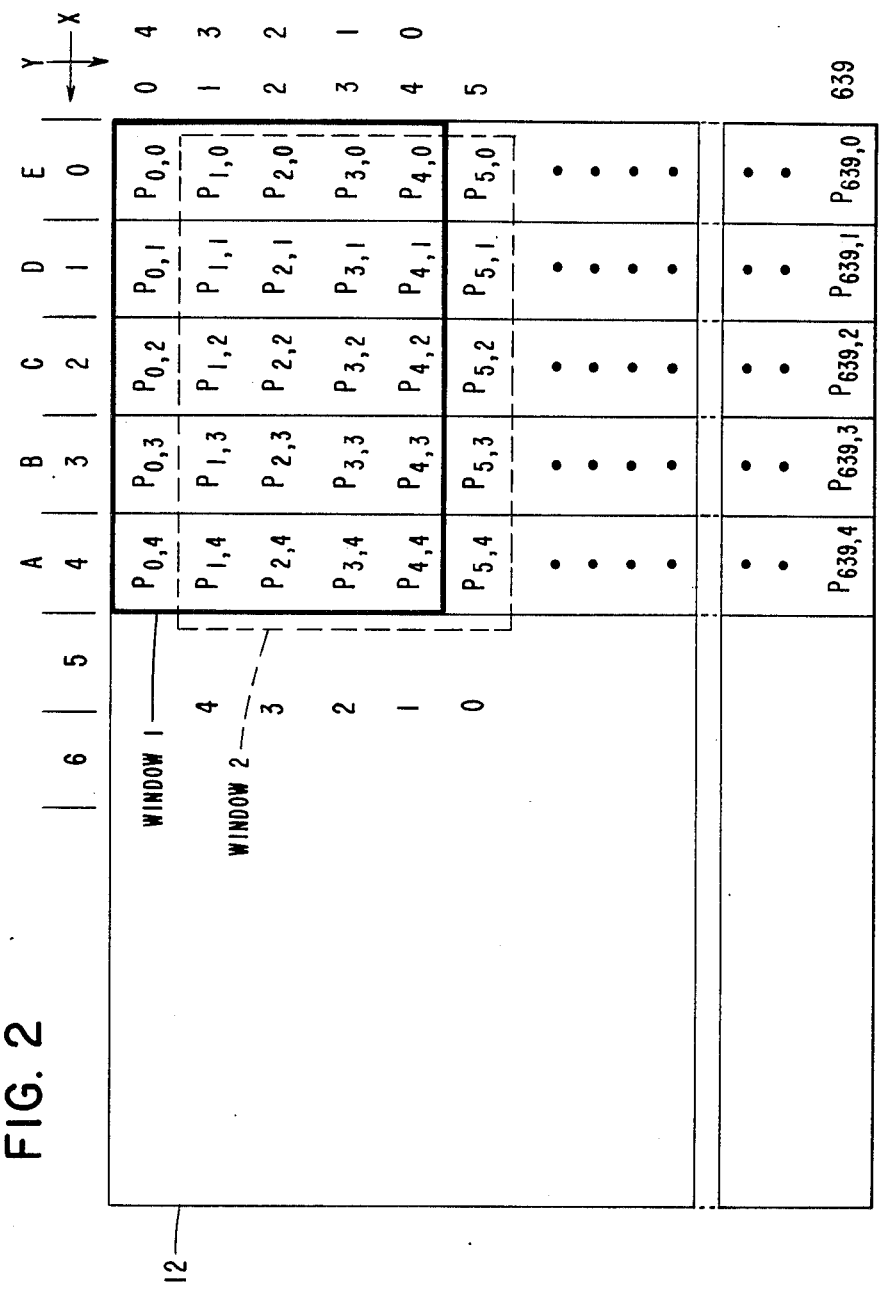
FIG. 2 is an illustration of the surface of a document to be scanned by the system of FIG. 1 showing the rows and columns of picture elements sensed thereby.

Turning to FIG. 2, a document to be scanned 12 is shown including the pixels viewed by the sensor array 10. The pixels of document 12 will be scanned in a series of vertical scans in the Y direction from 0 to 639. With each vertical scan, the document 12 will be advanced in the X direction starting with vertical scan 0 and continuing for the length of the document 12. The filter circuit 22 of FIG. 1 utilizes the vertical scans and the separate sensing of each pixel to establish a window for applying the described filter. In FIG. 2, each pixel is identified by the letter P followed by two numbers wherein the first number identifies the pixel number and the second number identifies the vertical scan. For instance, $P_{3,2}$ identifies pixel number 3 in vertical scan 2.

As the filter utilized by circuit 22 of FIG. 1 is a 5×5 two-dimensional matrix, the window upon which the filter operates is not complete until pixel number 4 of vertical scan 4 has been read. This window is shown in FIG. 2 and identified as window 1 and extends from vertical scan 0 to vertical scan 4 and from pixel 0 through pixel 4. The columns of window 1 are alphabetically lettered A through E starting at the leftmost column (vertical scan 4). The rows of window 1 extend from pixel number 0 through pixel number 4 and are identified as rows 0 through 4 starting from the lower most row (pixel number 4) and extending upward. As will be explained, the pixel being enhanced by window 1 is identified as $P_{2,2}$.

When the pixel identified as $P_{5,4}$ is read by the sensor array 10 of FIG. 1, the window in FIG. 2 will shift downward one row as identified by window 2 in FIG. 2. It will be noticed that in window 2, row 0 extends through pixel number 5 for vertical scans numbered 0 through 4. Those pixels in row 0 of window 1 now become row 1 of window 2, and pixels in row 1 of window 1 become row 2 in window 2, etc.

In this manner, the window operated on by filter circuit 22 of FIG. 1 is moved downwardly one row for each pixel read until all 640 pixels of the sensor array 10 have been read. The next vertical scan, identified as vertical scan 5, is then started and the pixels 0 through 639 are sequentially accessed as before. In this case, the window will return to the top row of pixels, and the window will move one column to the left. Thus, column A of the new window will appear at vertical scan number 5, column B at vertical scan number 4, etc. The window will then be moved downwardly as previously described.

It will be understood that the top and bottom two rows and the right and left two columns of the document will not contain complete information, and are processed by conventional border detection techniques as are known.

Figure 3:
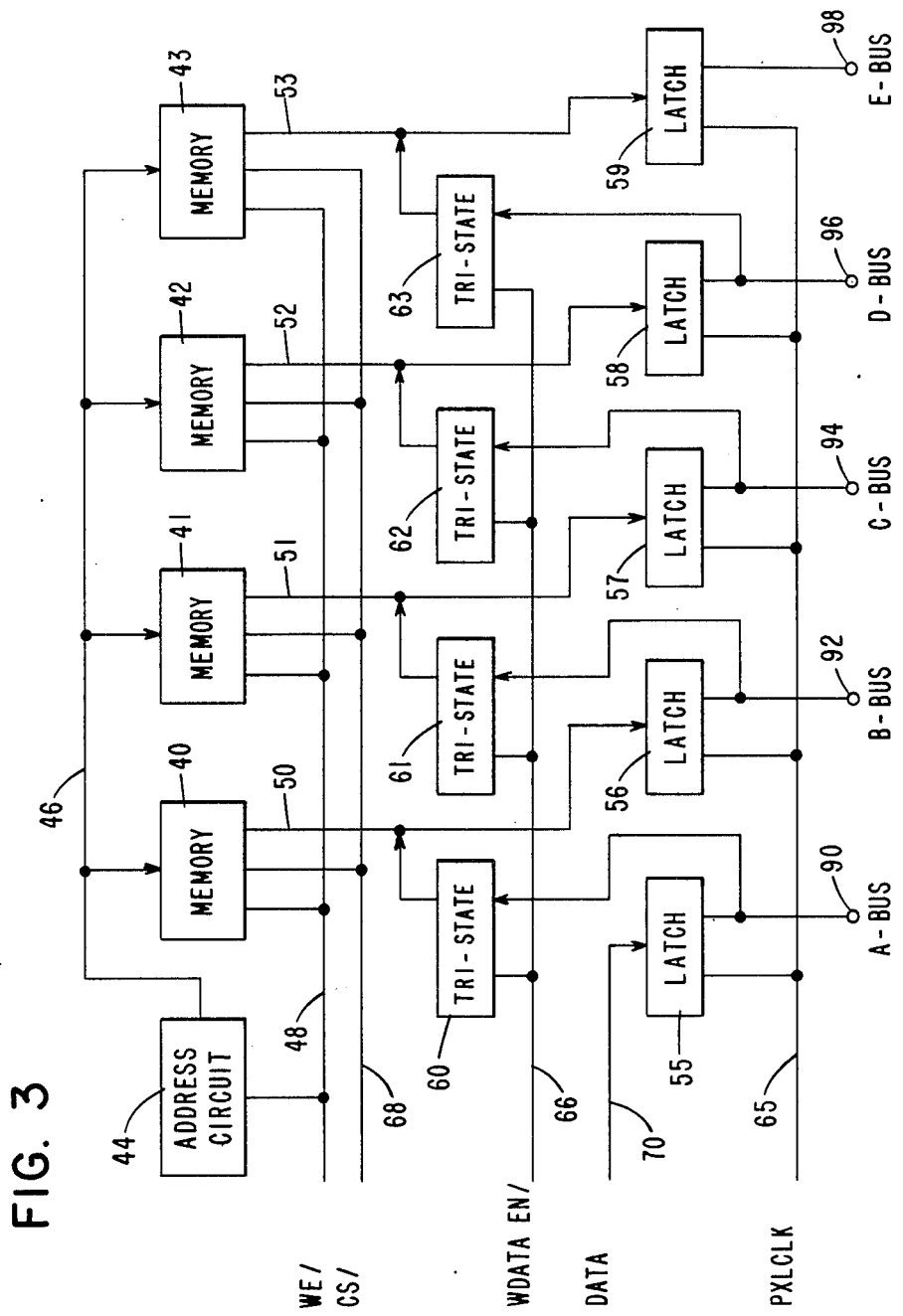
FIG. 3 is a block diagram of a portion of the filter circuit of FIG. 1.

FIG. 3 is a block diagram of a portion of the circuit of the filter circuit 22 in which a window for the 5×5 filter as illustrated in FIG. 2 is determined. The circuit includes random access memories or RAMs 40 through 43 in which the gray level values of the pixels illustrated in FIG. 2 are stored. The RAMs 40-43 are in the preferred embodiment, a combination of RAM chips arranged such that the six bits representative of the 64 gray levels from each pixel may be stored sequentially for all 640 pixel elements in each scan line. An address circuit 44 is provided which transmits an address over a bus 46 which is connected to each of the RAMs 40-43. A signal WE/ is transmitted over conductor 48 to each RAM 40-43 and to address circuit 44. The signal WE/ causes the address circuit to increment by 1, and controls the data buses 50-53 of the RAMs 40-43 respectively. The contents of the RAMs 40-43 at the address appearing on the address bus 46 is simultaneously placed on the data buses 50-53 respectively. In this manner, the address circuit 44 addresses the RAMs 40-43 from 0-639. When the address circuit 44 counts through 639, the address circuit toggles and begins again at address 0 as will be explained.

Latches 55-59 are provided to latch the 5 pixel elements of an entire row in the window as illustrated in FIG. 2. Tri-state devices 60-63 are provided to control movement of pixel data from the latches 55-58 into RAMs 40-43 respectively. The data buses 50-53 of the RAMs 40-43 are connected to the inputs of the latches 56-59 respectively as shown. The latches 55-59 are controlled by a signal PXLCLK on conductor 65. Signal WDATA EN/ on conductor 66 controls the tri-state devices 60-63 allowing data from a connected latch to be passed through the respective tri-state device to the data bus of the connected RAM. As previously described, incrementing of the address circuit 44 and the writing of data to the RAMs 40-43 is controlled by the WE/ signal. A CS/ signal on conductor 68 controls the acceptance of data into RAMs 40-43. A data bus 70 is connected to the data input of latch 55 as shown, and is a part of data bus 18 for sequentially reading gray level data signals from the pixel sensors 16 in the sensor array 10 into latch 55.

Figure 4:
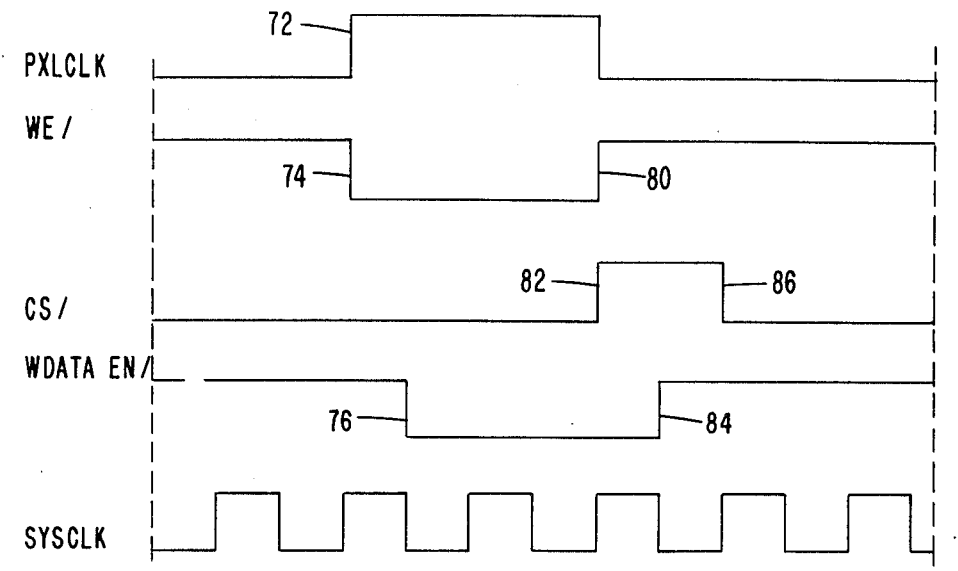
FIG. 4 is a timing diagram of control signals for the circuit of FIG. 3.

FIG. 4 is a timing diagram of the signals controlling data input from the pixel sensors 16 into the filter circuit 22. A system clock signal SYSCLK establishes the timing between the various signals. The signal PXLCLK which controls the latches 55-59 goes active at 72, thereby causing the pixel data on data bus 70 to be latched into the latch 55, and data output from RAMs 40-43 to be latched into latches 56-59 respectively. The signal WE/ goes active at 74, thereby turning off the data output of RAMs 40-43. Next, the WDATA EN/ signal goes active at 76, thereby activating tri-state devices 60-63 such that the data latched by latches 55-58 is accepted into RAMs 40-43 respectively. Thus, the RAMs 40-43 act as a shift memory wherein data in RAMs 40, 41 and 42 are shifted to the right into RAMs 41, 42 and 43 respectively at the address appearing on address bus 46 of FIG. 3, and the data from the latest read pixel is read into RAM 40.

The positive-going edge of signal WE/ at 80 causes the address circuit 44 to clock such that the address is increased by 1. The address circuit 44 toggles to 0 when the address reaches 640. The WDATA EN/ signal goes inactive at 84, thereby disabling tri-state devices 60-63 such that data in the latches 55-58 is no longer passed to the data buses of the RAMs 40-43. The CS/ signal then goes active at 86 to allow data from the RAMs 40-43 to be read into latches 56-59 respectively and data from a new pixel to be read over data bus 70 into latch 55. The described sequence then starts over again as described.

As shown in FIG. 3, the output of latch 55 goes to A-bus at 90, the output of latch 56 goes to B-bus at 92, the output of latch 57 goes to C-bus at 94, the output of latch 58 goes to D-bus at 96, and the output of latch 59 goes to E-bus at 98. The significance of these buses will be discussed later.

Figure 5A:
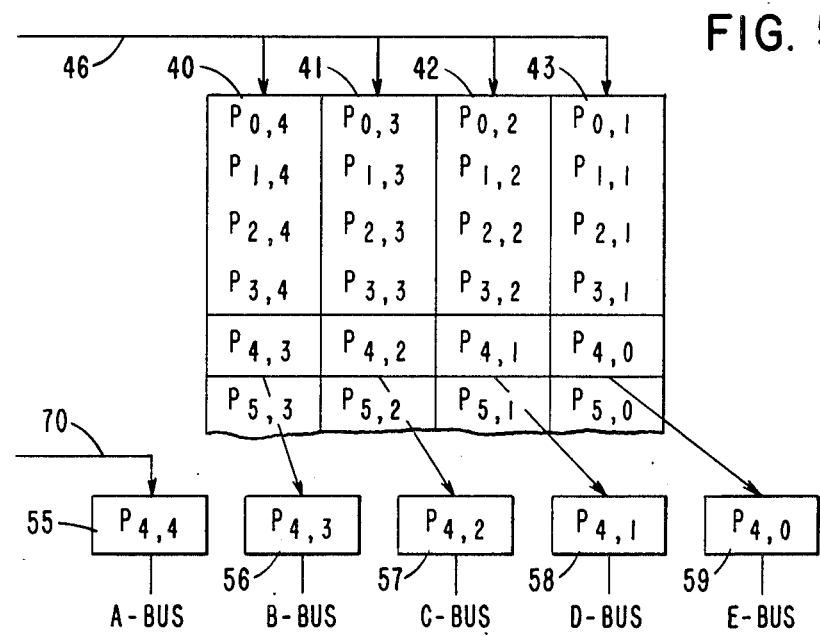
FIGS. 5A–5C give a graphic illustration of the functions of the circuit portion of FIG. 3.
Figure 5B:
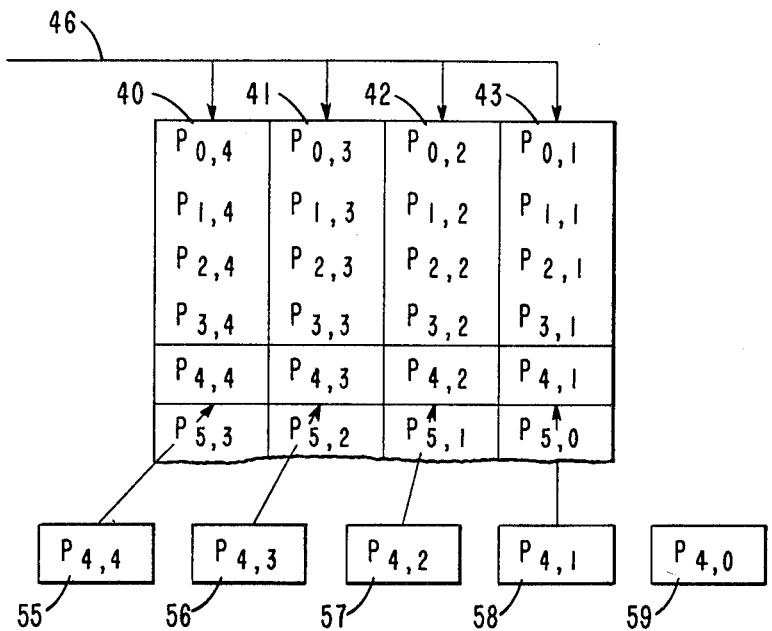
Figure 5C:
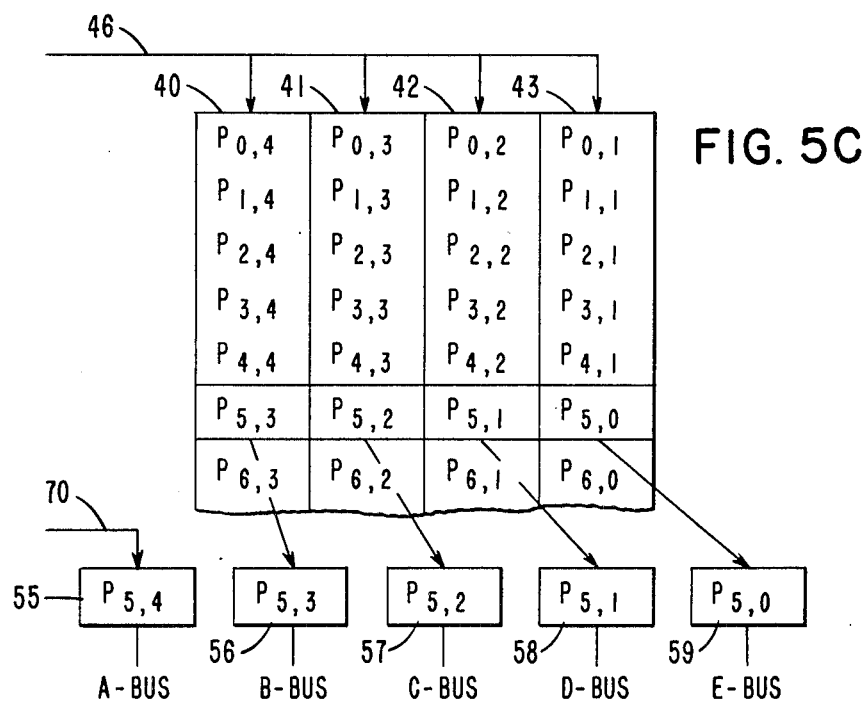

FIGS. 5A, 5B and 5C give a graphic illustration of the functions just described. FIG. 5A illustrates the reading of pixel $P_{4,4}$ which completes the first window shown as window 1 of FIG. 2. As described, the gray level value of pixel $P_{4,4}$ is read into latch 55, and the previously-read gray level values of pixels $P_{4,3}$; $P_{4,2}$; $P_{4,1}$; and $P_{4,0}$ are read into latches 56-59 respectively as shown. The address which is equal to 4, is applied on address bus 46 to specify the memory-location of RAMs 40-43 from which the pixel values are to be read. As described in connection with FIG. 4, when the WDATA EN/ signal goes active at 76, the pixel values in latches 55-58 are shifted one column to the right and read into address 4 of RAMs 40-43 as shown in FIG. 5B. Upon the arrival of positive-going edge 80 of signal WE/, the address on address bus 46 is increased to 5, indicating that the next address to be read from RAMs 40-43 is equal to 5. Upon the arrival of negative-going edge 86 of signal CS/, the gray level values of the pixels in RAMs 40-43 will be made available for reading into the latches 56-59 respectively. Also, the next-read pixel will be $P_{5,4}$ which is made available to latch 55. When the signal PXLCLK goes active once again, these values will be latched into latches 55-59 as previously explained. It can thus be seen by comparing the values in the latches 55-59 in FIG. 5A to the values in these latches in FIG. 5C that the window has moved down one row as graphically illustrated as window 2 in FIG. 2. FIGS. 5A and 5C thus illustrate what can be thought of as a one scan line delay between each of the data buses A–E. For instance, in FIG. 5A all of the pixels in the fourth row are located in the latches 55–59. In latch 59, the fourth pixel in scan line 0 of FIG. 2 (column E of window 1) is present, while in latch 58 the fourth pixel in scan line 1 (column D) is present. Similarly, a delay of one scan line from scan 1 (column D) to scan 2 (column C) results in the fourth pixel of scan line 2 being present in latch 57.

FIG. 6 illustrates a 5×5 two-dimensional matrix of a window such as that shown in FIG. 2, wherein the pixel elements contained in the matrix are identified by letters and numbers. The letters represent columns and the numbers represent rows in the matrix. For instance, letter A represents the first column on the left of the matrix, letter B represents the next column, letter C the third column, etc. The number 0 represents the first row starting at the top of the matrix, the number 1 represents the next row, the number 2 represents the center row, etc. The central element C2 is the element being enhanced by the filter circuit 22 of FIG. 1.

FIG. 7 is a 5×5 two-dimensional matrix containing the numerical values of the weighting factors of the numerical filter. It will be noted that the numerical values in FIG. 7 have a North-South symmetry, and an East-West symmetry. In other words, the values of the first row North of or above the central element 16 are equal to the values of the first row South of or below the central element 16. Likewise, the values of the second row North of the central element 16 are equal to the values of the second row South of the central element 16. Likewise, the numerical values of the first column West of or to the left of center element 16 are equal to the numerical values of the first column East of, or to the left of, center value 16. Also, the numerical values of the second column West of center element 16 are equal to the numerical values of the second column East of center element 16. These symmetrical properties of the numeric filter matrix are taken advantage of to reduce the numbers of multipliers needed to solve equation 1.

FIGS. 8A, 8B and 8C give a graphical representation of the solution of equation 1. FIG. 8A graphically represents the multiplication of each element of the matrix of FIG. 6 times each element of the numerical filter matrix illustrated in FIG. 7. For instance, the product of the element in column B, row 1 of the matrix of FIG. 6 times the corresponding element of the matrix of FIG. 7, is $(B_0 \times -1)$ or $-B_0$ as shown in FIG. 8A. The remaining elements in the matrix of FIG. 8A show the results of the corresponding multiplication of the elements of the matrix of FIG. 6 times the elements of the matrix in FIG. 7.

FIG. 8B is a reorganization of the matrix of FIG. 8A wherein the common terms have been factored out and the non-zero values of column A have been moved to be adjacent to the non-zero values of column E. FIG. 8C is a reorganization of the matrix of FIG. 8B wherein certain adjacent elements of the matrix have been joined together in blocks. It will be observed that the absolute value of the elements of block 100 of row 0 have the same multipliers as the absolute values of the elements of block 102 of row 1, block 104 of row 3, and block 106 of row 4. Thus, by using the window shifting technique of the circuit of FIG. 3 wherein a window is shifted downwardly one row for each pixel read into the circuit of FIG. 3, it can be seen that the absolute values of block 102 can be found by merely shifting the values determined for block 100 one row downwardly. Further shifting of the values downwardly will result in the values of blocks 104 and 106 for rows 3 and 4. The multiplier of blocks 100 and 106 is $-1$, and the multiplier of blocks 102 and 104 is $+1$.

The absolute values of rows 1, 2 and 3 of block 108 can be found in a similar manner by shifting the window downwardly with the circuit of FIG. 3.

To complete the calculation of Equation 1, the products of all the elements of the matrices shown in FIGS. 6 and 7 are added together to find a grand total. By making use of the North-South and East-West symmetry described, Equation 1 for a 5×5 two-dimensional window is solved by the use of ten summations and three multiplications. Since all of the multipliers are powers of 2, these multiplications are accomplished by merely shifting bits during the summation process.

Figure 9:
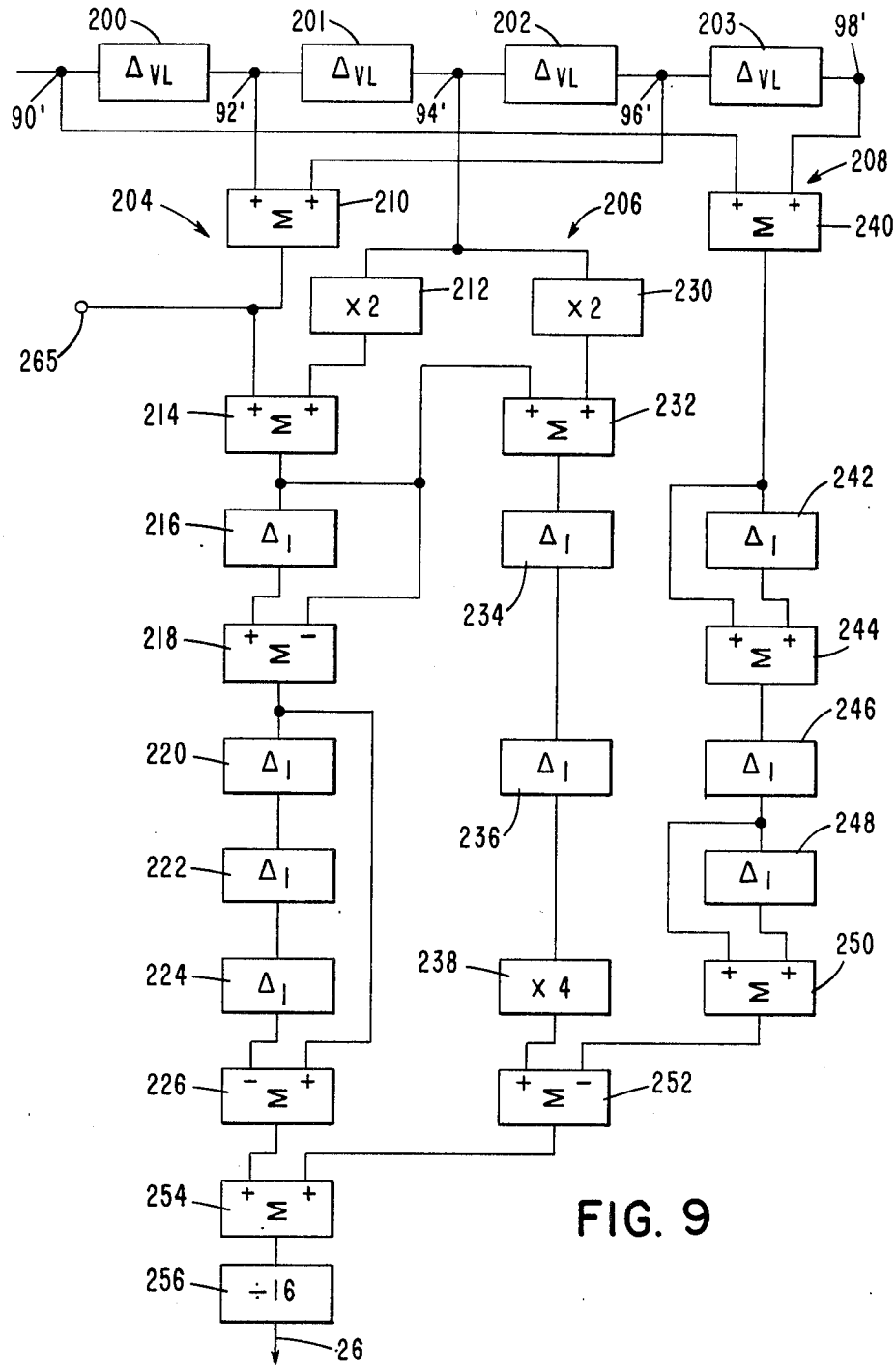
FIG. 9 is a block diagram of a circuit for accomplishing the solution graphically represented in FIG. 8C.
Figure 10A:
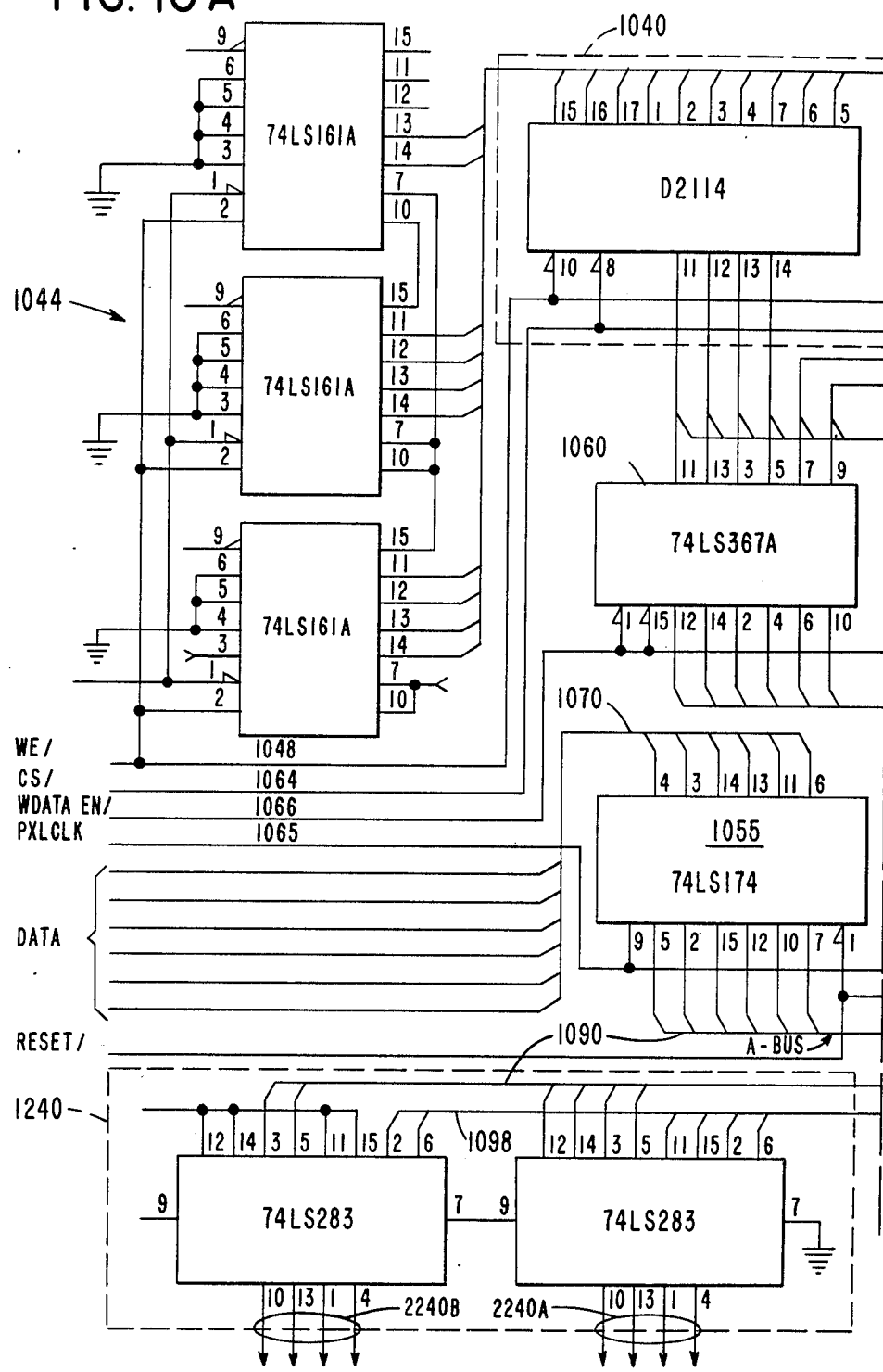
Figure 10B:
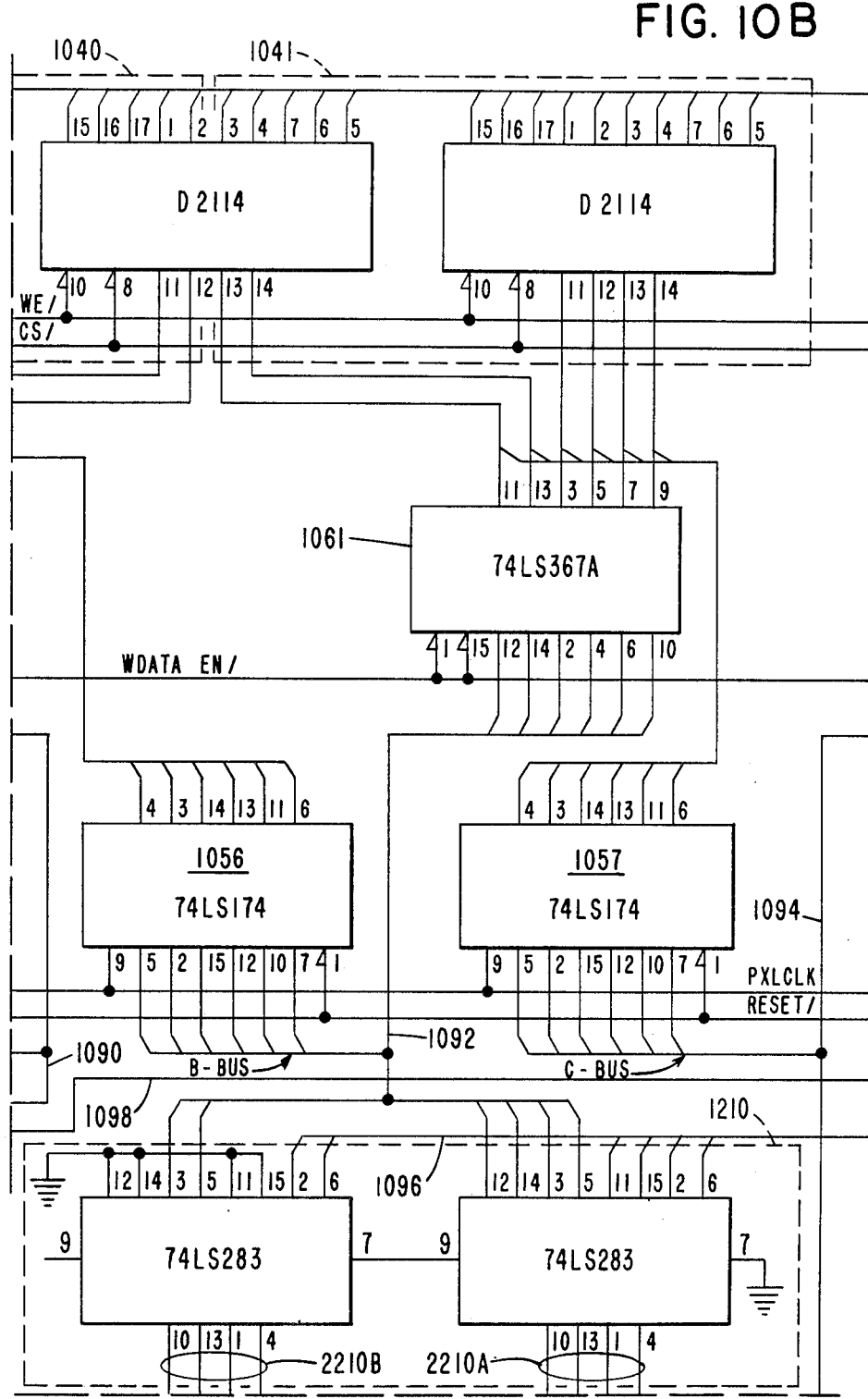
Figure 10C:
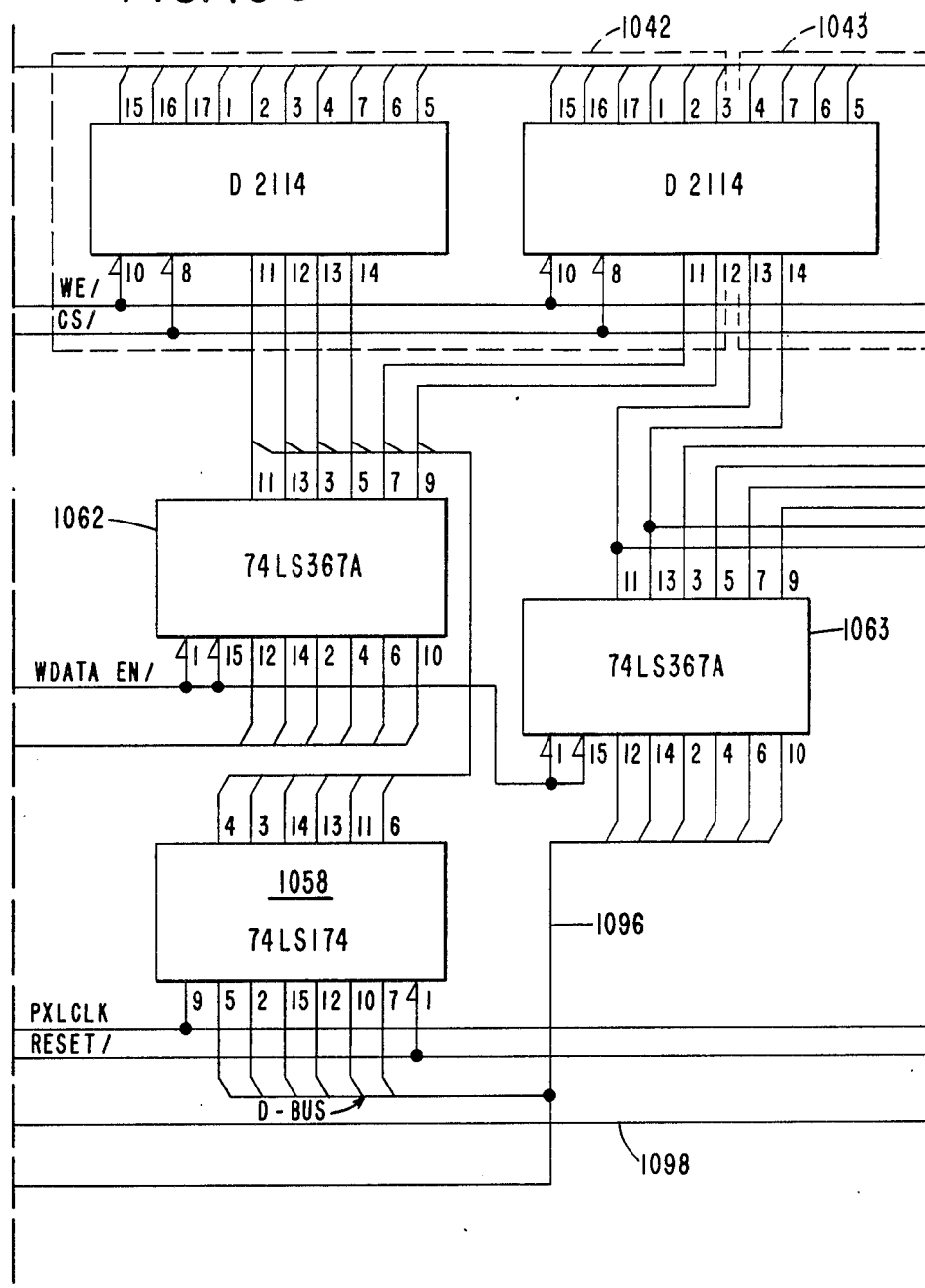
Figure 10D:
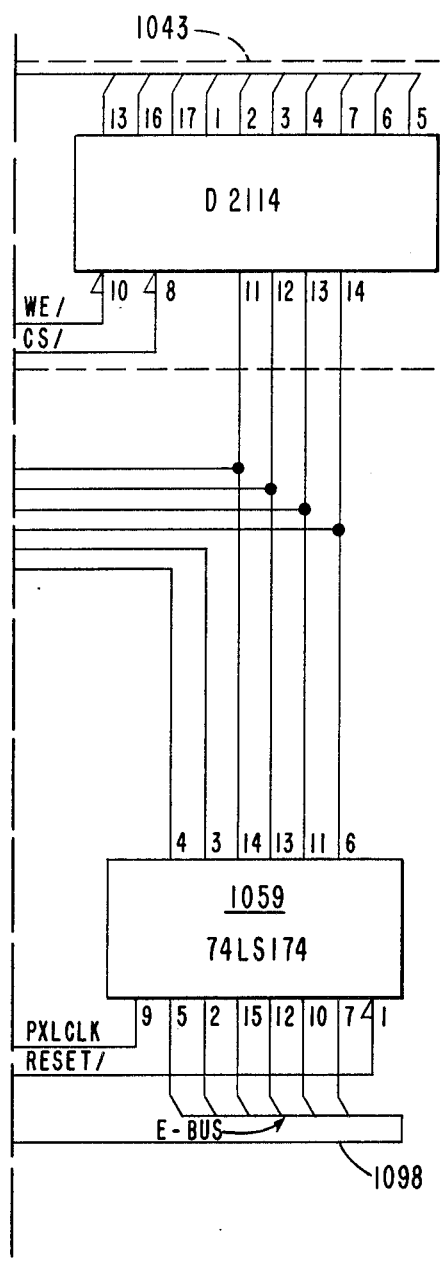

FIG. 9 is a block diagram of a circuit for accomplishing the solution graphically represented in FIG. 8C. The solution calculated at each point in the block diagram of FIG. 9 is abbreviated hereafter by letters and numbers. A number before a letter indicates a multiplication and a subscripted number at the end of the equation represents the row being operated on. The letter represents the column from which the row element is taken. The column letters and row numbers correspond to those used in FIGS. 8A–8C, as shown for windows 1 and 2 in FIG. 2. It will be understood that all elements are summed together. Thus, the equation $(-1) \times (B_0 + 2C_0 + D_0)$ is represented as $-BD2C_0$. Likewise, the equation $(4) \times (B_2 + 4C_2 + D_2)$ is represented as $4BD4C_2$.

FIG. 9 is a block diagram representing the filter circuit 22 of the image enhancement circuit 20 of FIG. 1. Blocks 200, 201, 202 and 203 represent the vertical scan line delays of the circuit discussed in connection with FIG. 3, and reference numbers 90'–98' indicate buses A–E numbered as 90–98 respectively in FIG. 3. As each pixel sensor 16 as shown in FIG. 1 is read into filter circuit 22, a new row in the window of pixels as described in connection with FIG. 2 is read. The pixel elements in this new row are identified as $A_0$–$E_0$ at 90'–98' respectively. The leftmost column of elements 204 of FIG. 9 generally calculates the values represented by blocks 100, 102, 104 and 106 of FIG. 8C; the central column of elements 206 of FIG. 9 generally calculates the central block 110 of FIG. 8C; and the rightmost column of elements 208 in FIG. 9 generally calculates the values of block 108 of FIG. 8C.

The values of $B_0$ at 92' and $D_0$ at 96' are summed by an adder 210 to give the value of $BD_0$. The value of $C_0$ at 94' is multiplied by 2 at 212 and the product is added to the sum determined by adder 210 by an adder 214. Thus, the output of adder 214 is $BD2C_0$. As previously mentioned, the multiplication by 2 of 212 is accomplished by shifting the bits of the $C_0$ value at 94' during the summation by adder 214.

The value of $BD2C_0$ output by adder 214 is stored in a latch 216 controlled by the PXLCLK signal discussed in connection with FIGS. 3 and 4. Thus, latch 216, and similar latches to be discussed in connection with FIG. 9, effect a one-pixel delay. For instance, latch 216 latches values of pixels read from row 0 in the window, which are held until the PXLCLK signal again goes active, at which time the window as discussed in connection with FIG. 2 will have moved one row down. At this time, the row 0 values latched by latch 216 will become row 1 values in the window. Thus, the value of the output of latch 216 represents $BD2C_1$. The output of latch 216 is input into the positive side of an adder 218, and the output of adder 214 is input into the negative side such that the output of adder 218 is equal to $BD2C_1 - BD2C_0$. Three pixel delays are effected by latches 220, 222 and 224 connected in series such that the output of latch 224 is equal to $BD2C_4 - BD2C_3$. The output of adder 218 is input into the positive side of an adder 226, and the output of latch 224 is input into the negative side of adder 226 such that the output of the adder 226 is equal to $BD2C_1 - BD2C_0 + BD2C_3 - BD2C_4$. It will be noted that the output of adder 226 is equal to the sums of blocks 100, 102, 104 and 106 graphically illustrated in FIG. 8C. It will further be noted that this portion of the calculation for the enhanced pixel was accomplished by four adders and four latches.

The value of $C_0$ available at bus 94' is multiplied by 2 at 230 and added to the output of adder 214 by an adder 232. As previously discussed, the multiplication function of multiplier 230 is accomplished by shifting the bits of the value for $C_0$ one position. The output of adder 232 is equal to $BD4C_0$. The output of adder 232 is delayed two pixels by latches 234 and 236 as previously described. The output of latch 236 is multiplied by 4 at 238 to give the value of $4BD4C_2$ illustrated in block 110 of FIG. 8C.

The value of $A_0$ at bus 90' and the value of $E_0$ at bus 98' is summed by an adder 240 and is delayed one pixel by a latch 242, giving a value equal to $AE_1$. The output of adder 240 is summed with the output of latch 242 by an adder 244 and delayed one pixel by a latch 246 to give a value equal to $AE_1 + AE_2$. The output of latch 246 is delayed one pixel by a latch 248, and the output of latch 248 is added to the output of a latch 246 by an adder 250 to give a value equal to $AE_1 + 2AE_2 + AE_3$. This value is equal to the value represented graphically by block 108 in FIG. 8C.

The output of adder 250 is connected to the negative side of an adder 252, and the output of latch 236 multiplied by 4 at 238 is input into the positive side of adder 252 which sums the outputs of columns 206 and 208. An adder 254 adds the outputs of adders 226 and 252 to give a total sum of the values calculated by columns 204, 206 and 208. The results of the summation by adder 254 are divided by 16 as represented by block 256 to give the gray level value for an enhanced pixel as previously described. The divide-by-sixteen function of block 254 is actually accomplished by shifting the bits in the output of adder 254.

Figures 11, 11E:
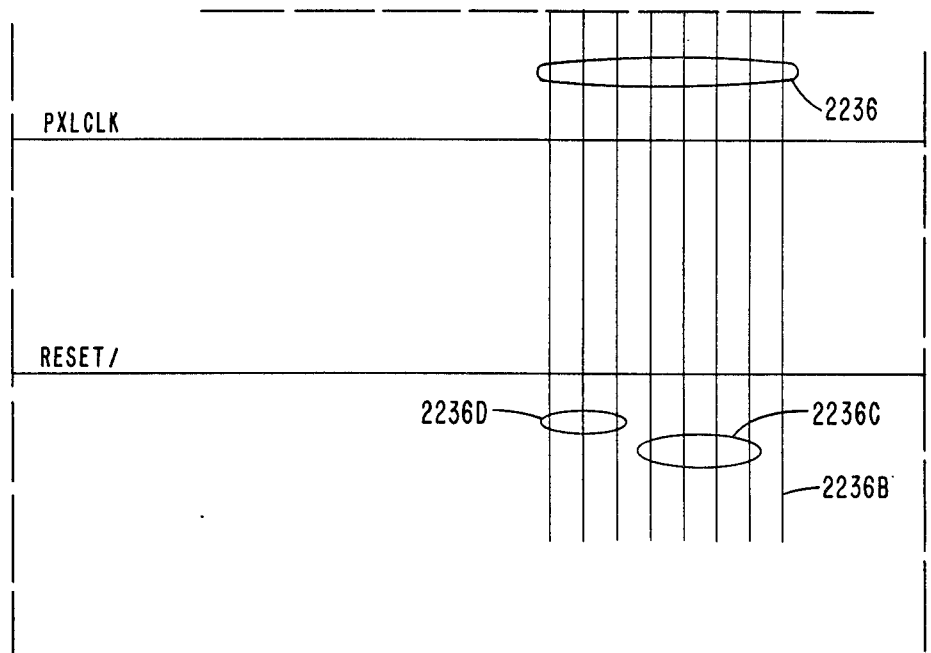
FIGS. 11A–11F, arranged as shown in FIG. 11, is a partial schematic diagram of the circuit illustrated in FIG. 9.
Figure 11A:
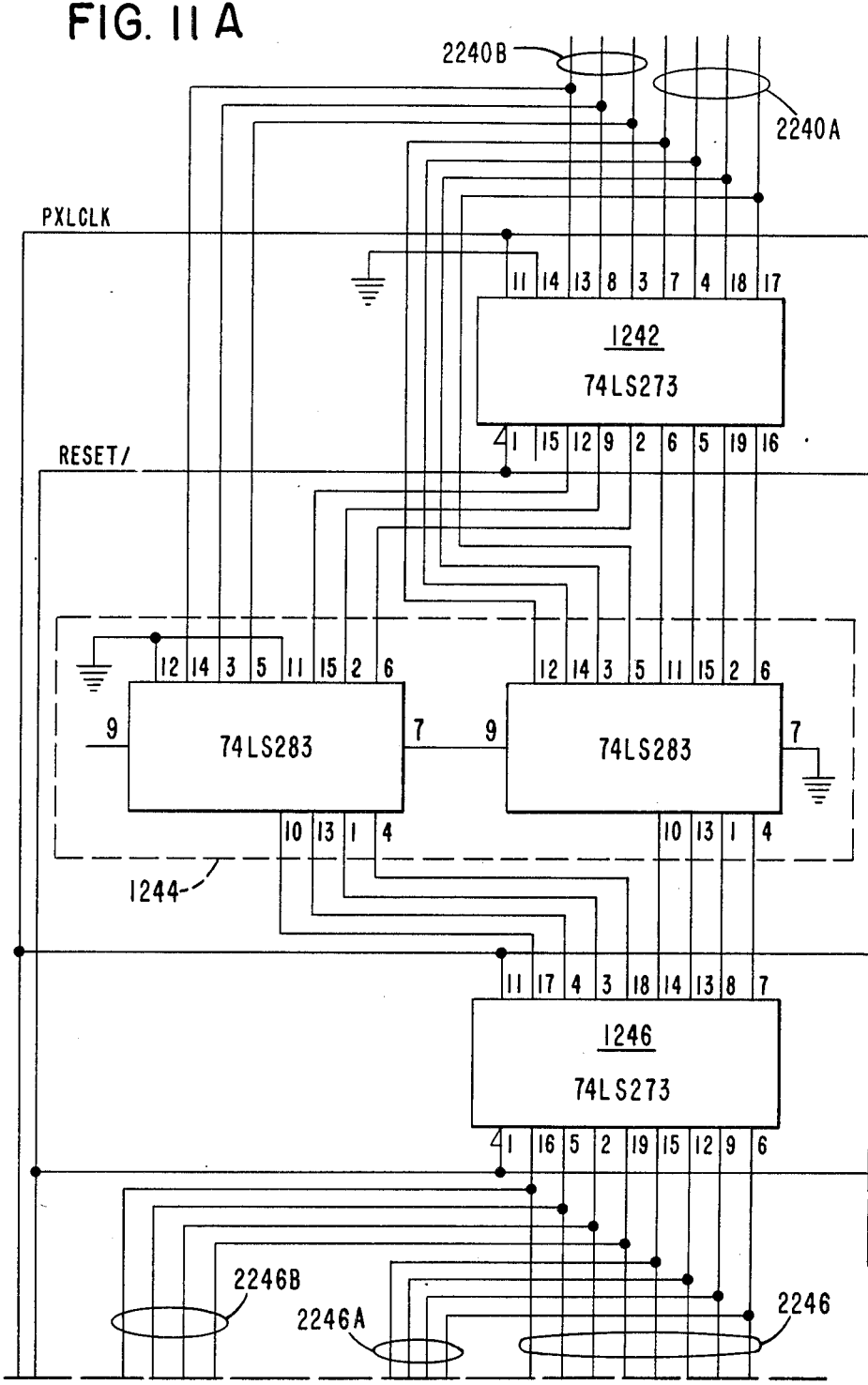
Figure 11B:
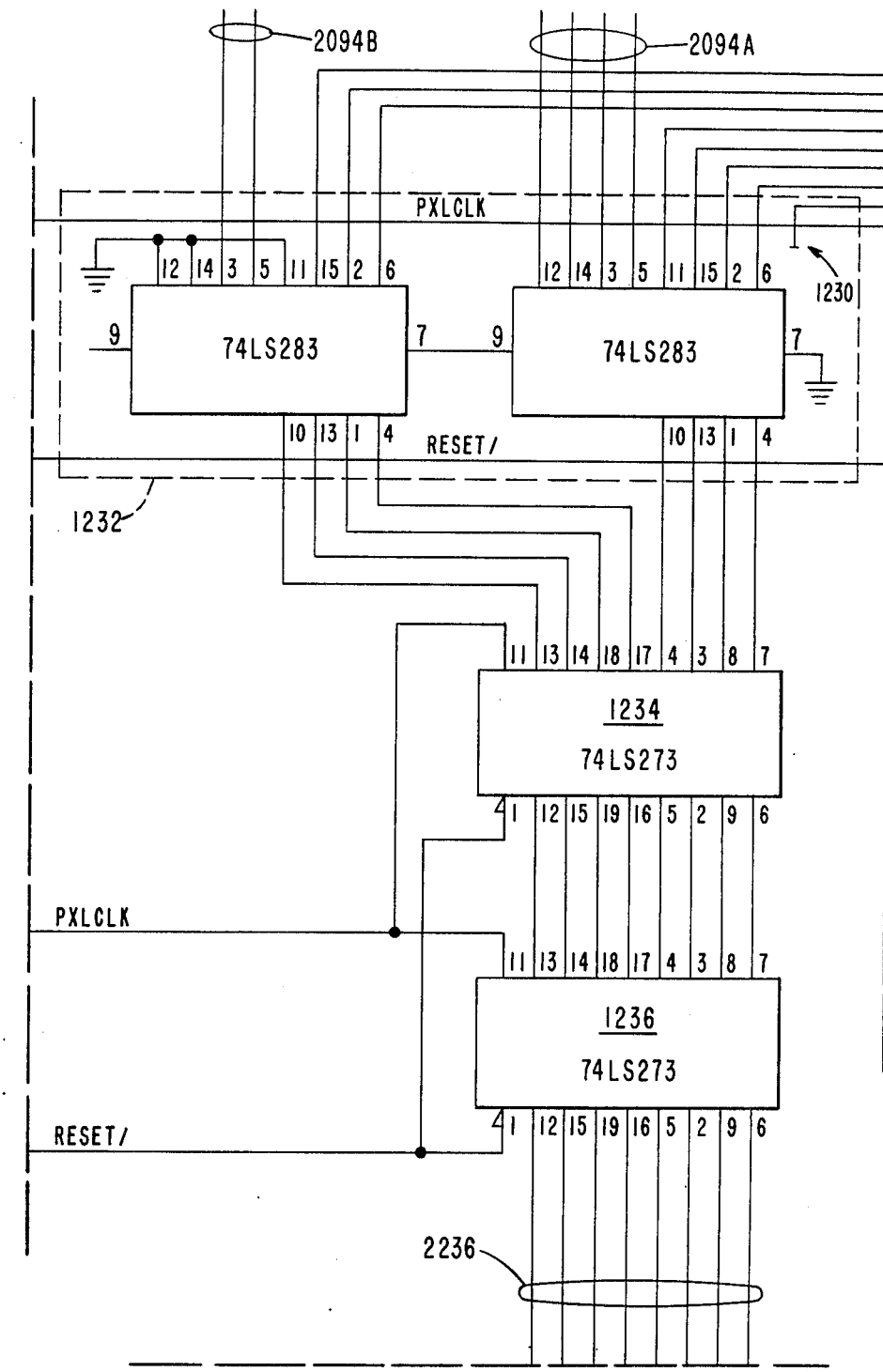
Figure 11C:
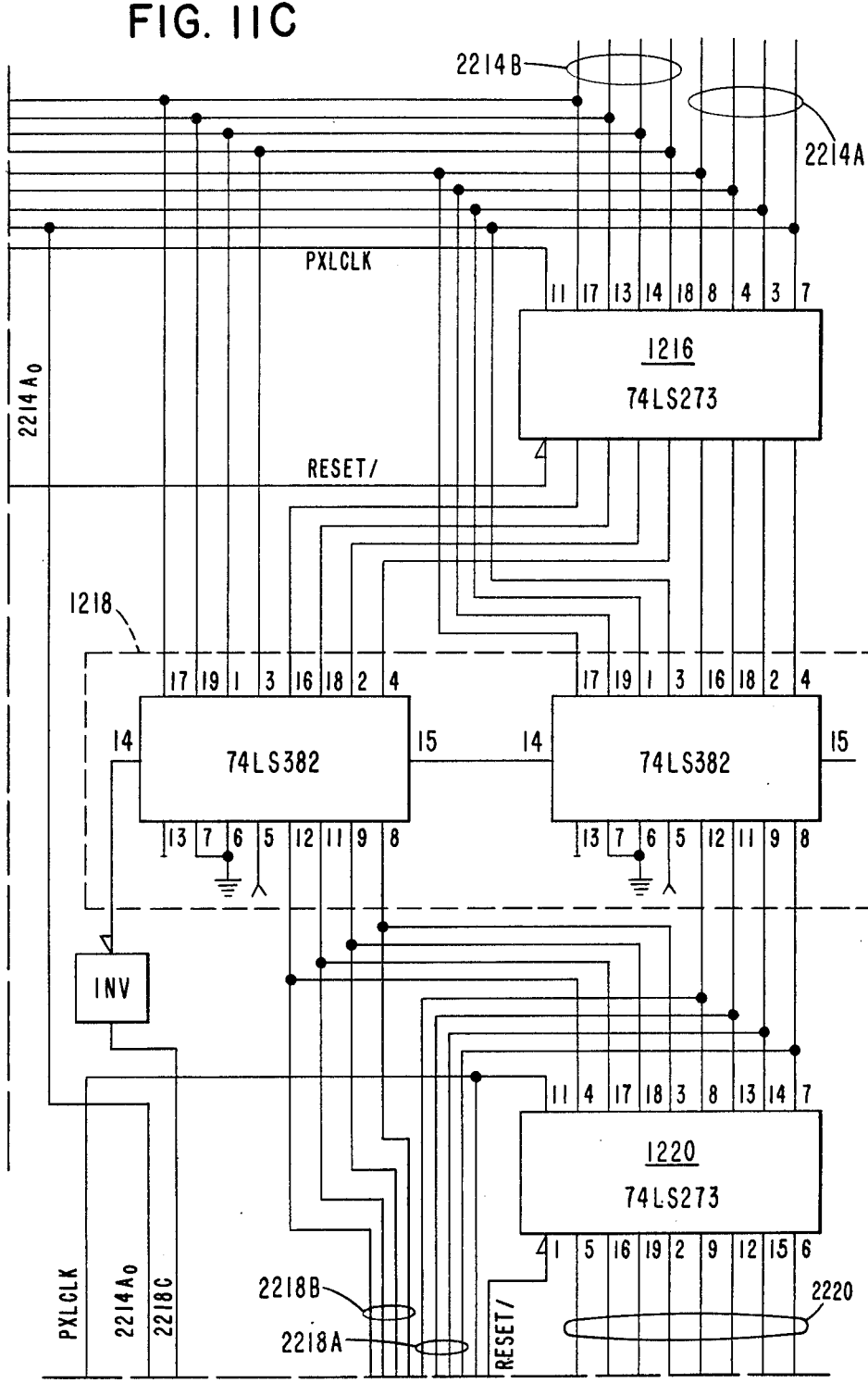
Figure 11D:
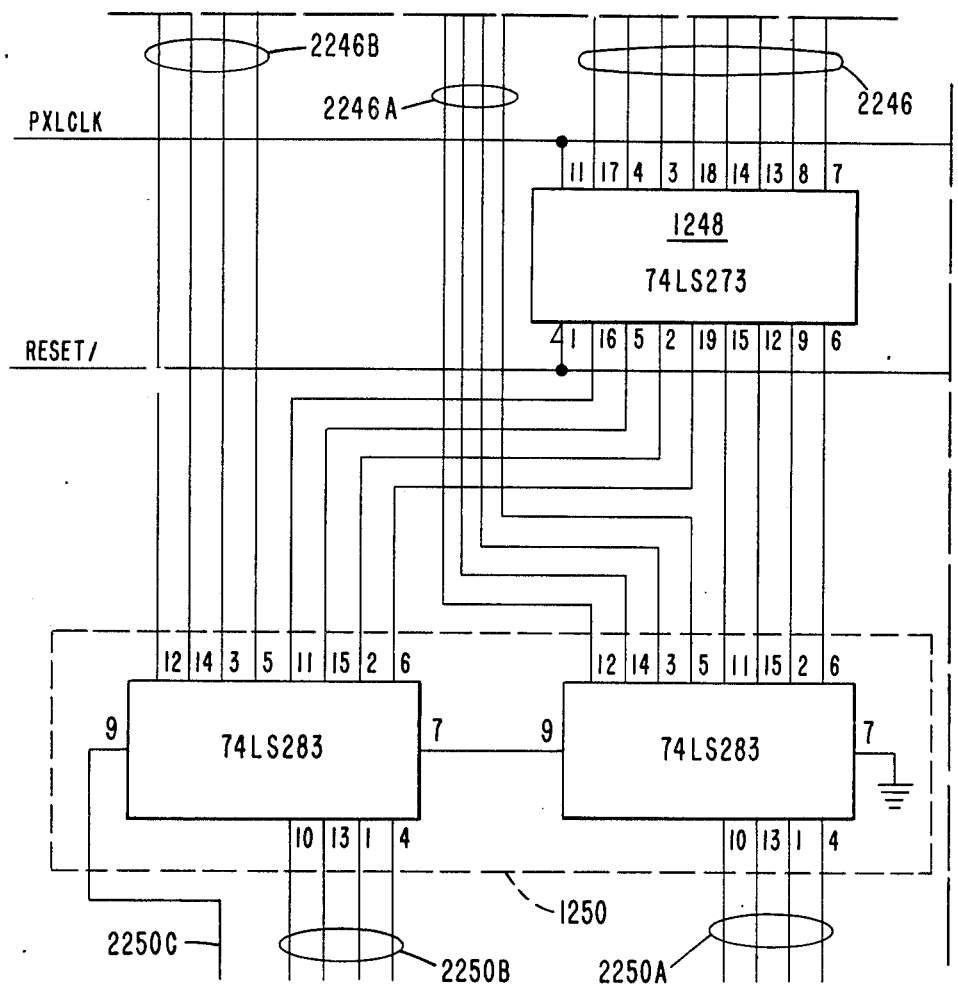
Figure 12C:
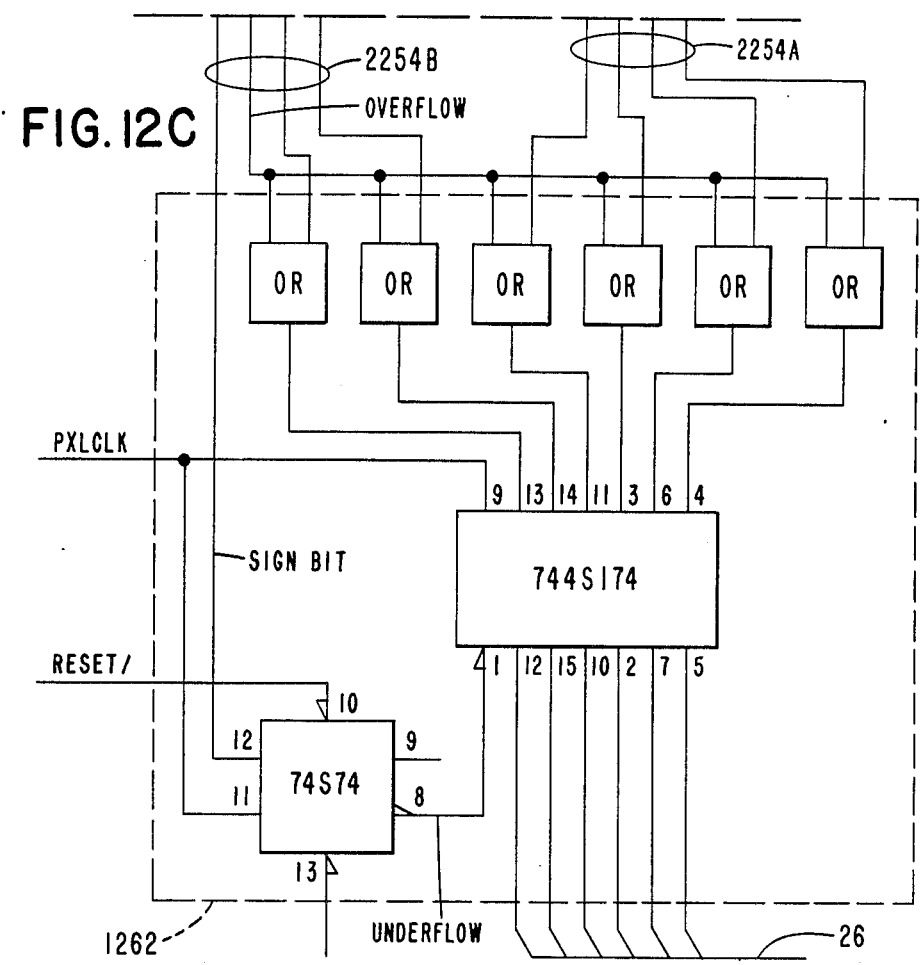
FIGS. 12A–12C, arranged as shown in FIG. 12, is a partial schematic diagram of the circuit illustrated in FIG. 9.
Figure 12:
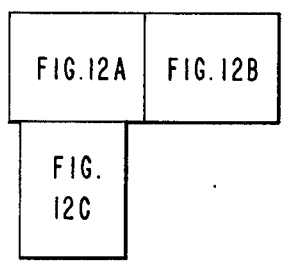
Figure 12A:
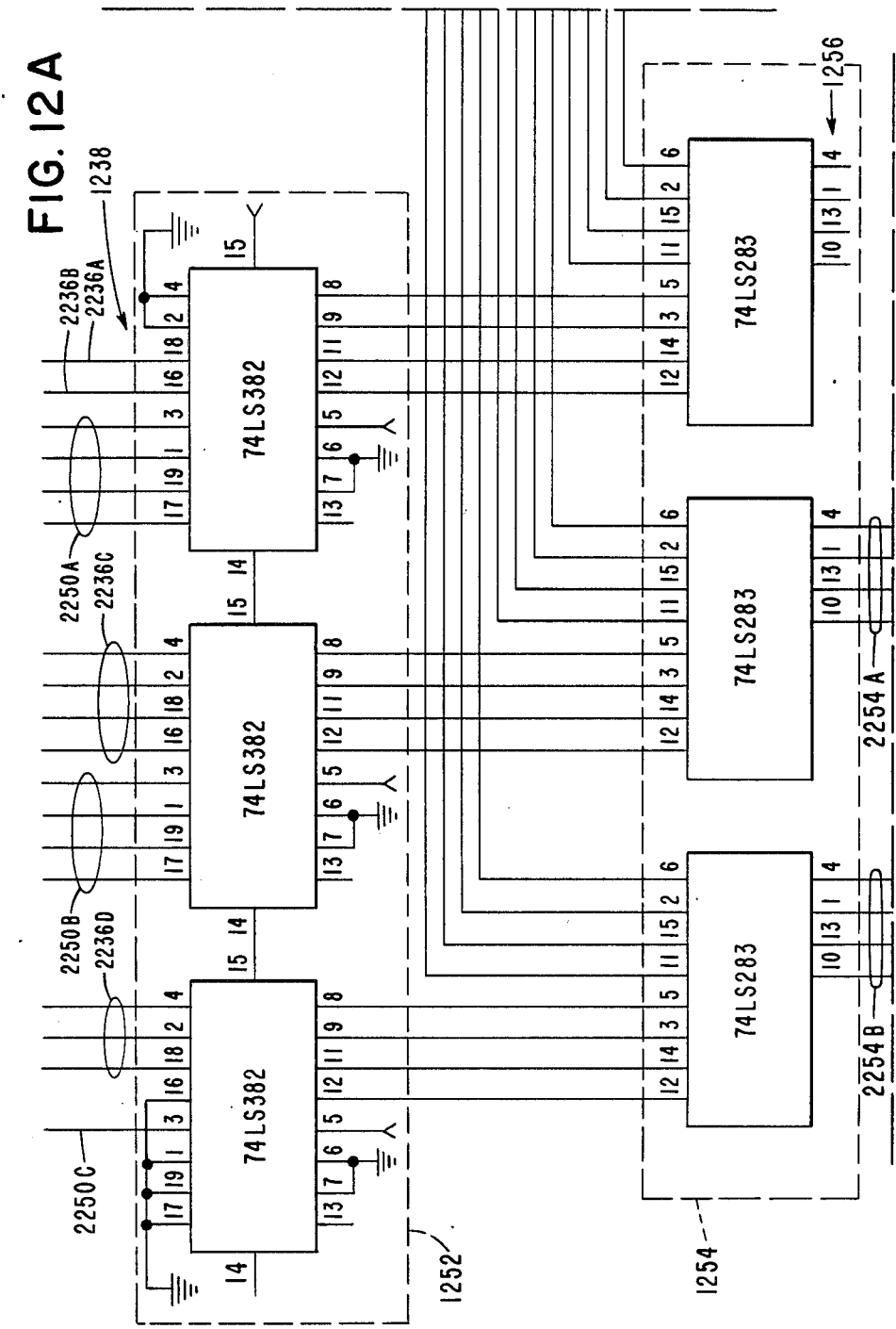
Figure 12B:
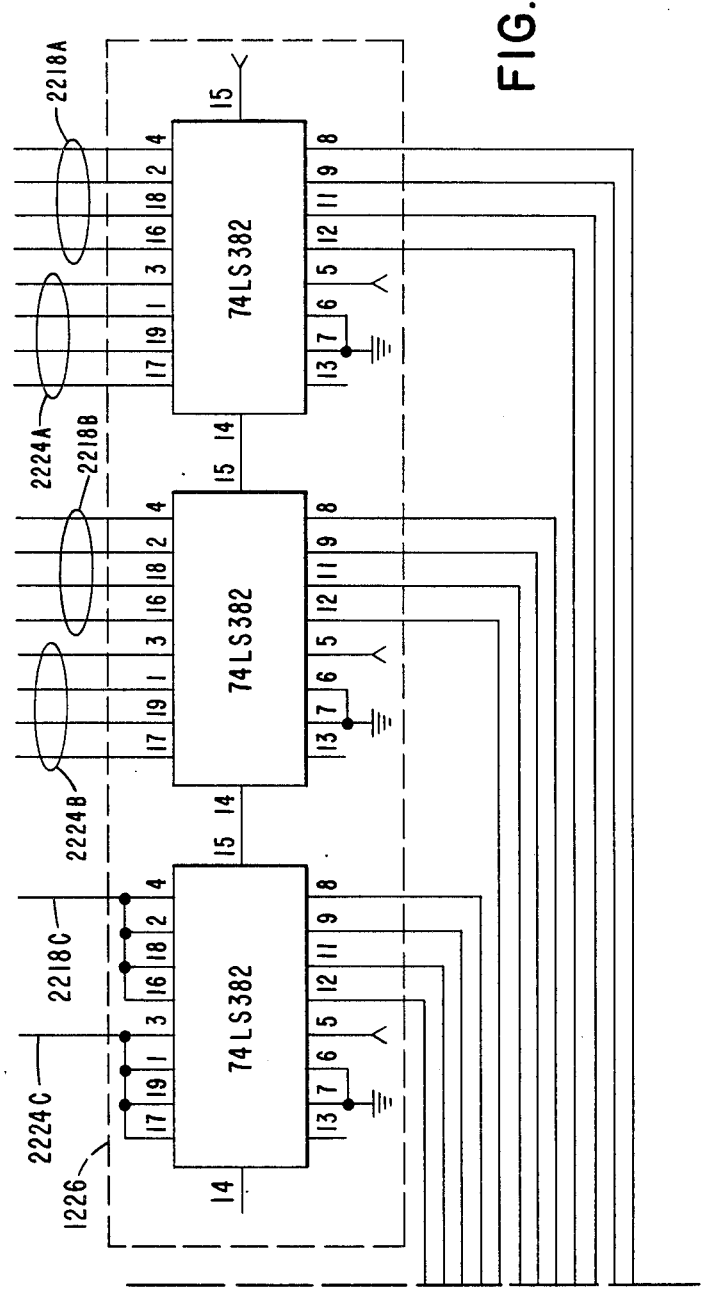
Figure 13:
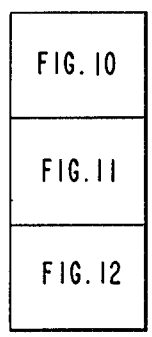
FIG. 13 is a map for the arrangement of the schematic diagram portions of FIGS. 10, 11 and 12.

FIGS. 10, 11 and 12 joined as shown in FIG. 13 is a schematic diagram of the circuit shown in FIG. 9. This diagram may be understood by those skilled in the art wherein the manufacturer's number of the various chips are indicated in the diagram, and the pin connections of the various chips are identified around the periphery of each chip. The reference numerals of the various elements are the same as the reference numerals of FIGS. 3 and 9 with 1000 added thereto. Thus, the RAM 40 of FIG. 3 is identified on FIG. 10A as RAM 1040. The outputs of these elements have the same reference numerals as FIGS. 3 and 9 with 2000 added thereto. Thus, the output of adder 240 is identified as 2240A and 2240B, which has been divided into conductor groups 2240A and 2240B for clarity. Like groups of conductors are identified by the same reference numbers in FIGS. 10, 11 and 12, and will be readily understood by those skilled in the art for the proper interconnection of conductors between FIGS. 10, 11 and 12.

Figure 11F:
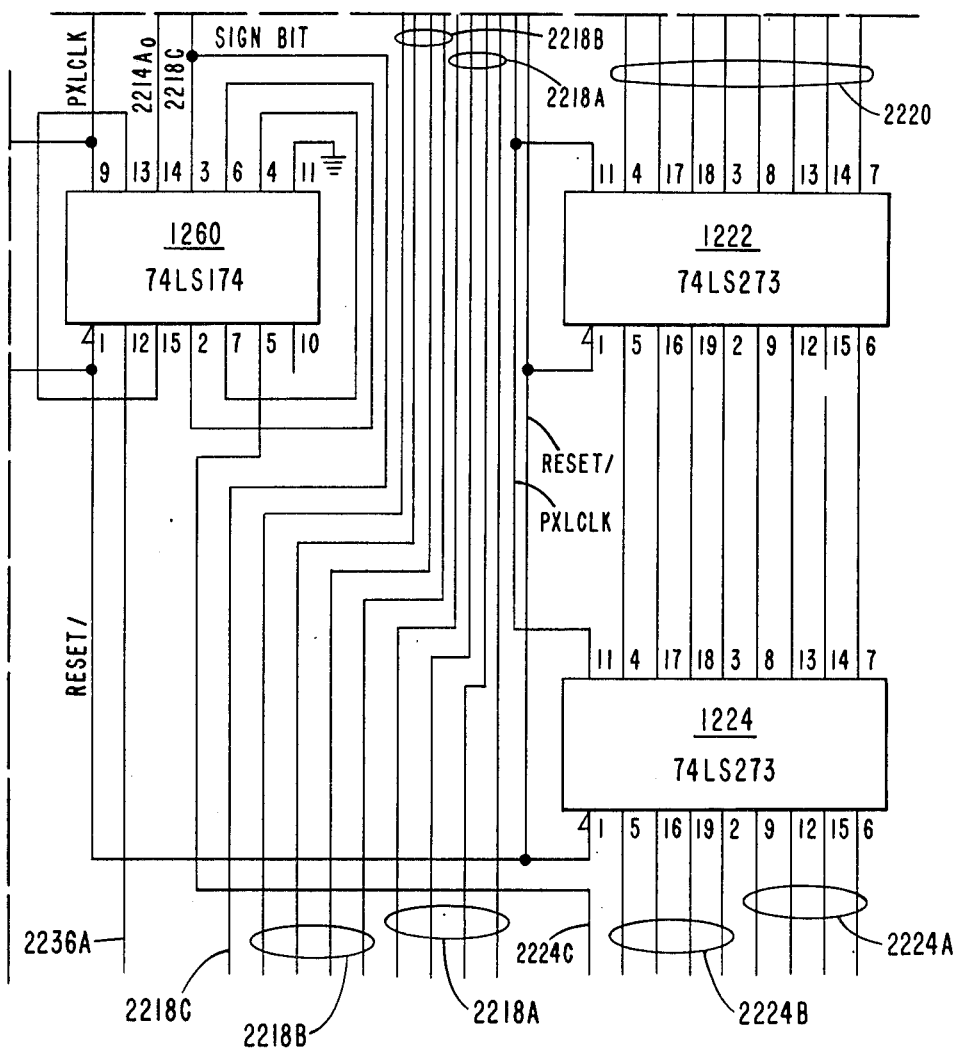

In FIG. 11F, it will be noted that latch 1260 acts to delay the sign bit 2218C output from adder 218 of FIG. 9 for three pixel delays, and the zero bit $2214A_0$ from the output of adder 214 of FIG. 9 for two pixel delays so that they may be added in by the adders 226 and 252 respectively of FIG. 9 to the correct pixel values.

In FIG. 12C, an overflow-underflow circuit 1262 is included to indicate an error in the enhanced pixel value. The circuit 1262 checks the sign bit of 2254B, and if a negative sign is indicated, all of the output bits on bus 26 of the filter circuit are turned off to indicate that an underflow error has occurred. If the seventh bit of the output from adder 1254, which is found in 2254B, is turned on, all of the output bits on bus 26 are turned on to indicate that an overflow error has occurred.

Figure 14:
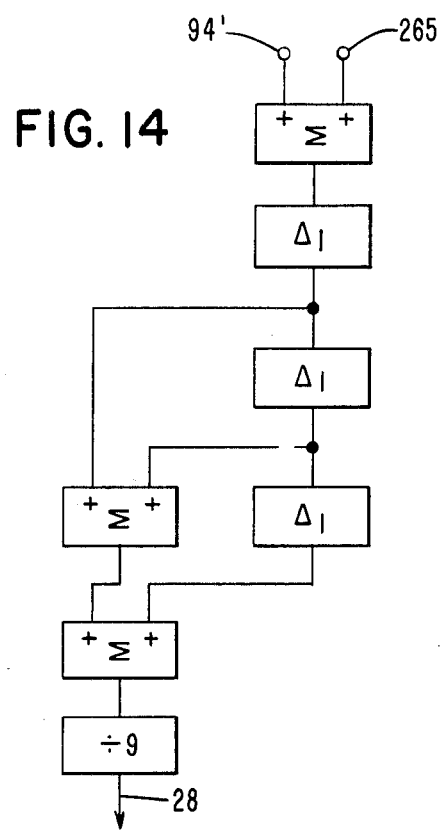
FIG. 14 is a block diagram of the averaging circuit of FIG. 1.

FIG. 14 is a block diagram of the averaging circuit 24 of FIG. 1. The averaging circuit of FIG. 2 has one input 265 connected to the output of adder 210 shown in FIG. 9, and one input connected to $C_0$ at bus 94' of FIG. 9. The averaging circuit of FIG. 12 adds the products of a 3×3 matrix centered on the center element $C_2$ of the 5×5 matrix and divides the sum total of all of these products by 9 to give an average value. As previously explained, this averaged value is used by a conventional binarizer circuit 30 shown in FIG. 1 to determine a binary value of the enhanced pixel output of filter circuit 22 as is known.

Thus, an improved document reading system has been described which enhances data recorded on the document by a numerical filter circuit. It will be understood that the disclosed embodiment described herein is exemplary only, and that modifications and changes may be made by those skilled in the art without departing from the spirit and scope of the invention as set forth in the appended claims.

What is claimed is:

1. In an apparatus for scanning a document image by sequentially presenting a gray level value of a plurality of elements arranged in a matrix having m rows and n columns, a device for enhancing the document image comprising;

sensor means having an array of sensor devices for scanning a column of the gray level values of the elements of the matrix, each sensor device for sensing a gray level value of a row element in a column being scanned;

reading means having an input connected to said sensor devices and an output, said reading means for sequentially reading said sensor devices and sequentially placing the gray level value of each sensor device on its output;

a plurality of memory devices each having an input-output means for receiving data to be read into each memory device and for providing data to be written out of each memory device, each of said memory devices for storing a column of m rows of gray level values from said sensor means;

an input register for storing gray level values therein, said input register having an input connected to the output of said reading means for receiving therefrom the gray level values, and an output for providing thereon the stored gray level values;

a plurality of element storage registers equal in number to the number of memory devices, each element storage register having an input connected to the input-output means of a corresponding memory device for receiving and storing data therefrom, and an output for providing thereon the data stored in said each element storage register;

a plurality of tri-state means equal in number to the number of memory devices, each of said tri-state means having an input for receiving data, an output for providing data, and a control terminal which, when enabled, places on its output data which is present on its input, the first of said tri-state means having its input connected to the output of said input register and its output connected to the input-output means of the first of said memory devices, and each of the remainder of said tri-state means successively having its input connected to a succeeding one of said element storage registers and its output connected to the input-output means of a succeeding one of said memory devices; and addressing means connected to the input-output means of said memory devices and the control terminals of said tri-state means for controlling the inputting of gray level values into and the outputting of gray level values out of said memory devices, said addressing means including first means for controlling the simultaneous storing of a gray level value from said reading means into said input register and a storing of data from a corresponding row of data entries in said memory devices into said element storage registers, and second means for enabling said tri-state means for writing data entries stored in said input data register and said element data registers into a corresponding one of said memory devices such that the data entries written from said element storage registers are shifted one column from their previous storage locations, such that the reading of the gray level value of each sensor device shifts a window of data in the matrix by one column and one row.

2. The device of claim 1, and further comprising:

means connected to the outputs of said data input register and said element storage registers for calculating a gray level value for the central element of the window in accordance with the weighting matrix as follows:

$$1/16 \begin{bmatrix} 0 & -1 & -2 & -1 & 0 \\ -1 & 1 & 2 & 1 & -1 \\ -2 & 4 & 16 & 4 & -2 \\ -1 & 1 & 2 & 1 & -1 \\ 0 & -1 & -2 & -1 & 0 \end{bmatrix}.$$

3. The device of claim 1 wherein the gray level values of the matrix elements are represented by a plurality of bits, the window is a submatrix having five rows and five columns, and the device further comprises:

a first adder having a first input connected to the output of said first storage register, a second input connected to the output of said third storage register, and an output for providing the sum of the data on its inputs;

a second adder having a first input connected to the output of said first adder, a second input connected to the output of said second storage register with the bits thereof shifted one place thereby effecting a multiplication by 2 of the contents of said second storage register, and an output for providing the sum of the data on its inputs;

a first delay register having an input connected to the output of said second adder, and an output;

a third adder having a first input connected to the output of said first delay register, a second input connected to the output of said second adder, and an output for providing the sum of the value on its first input and the negative value on its second input;

second, third and fourth delay registers connected in series, said second delay register having an input connected to the output of said third adder, and said fourth delay register having an output;

a fourth adder having a first input connected to the output of said fourth delay register, a second input connected to the output of said third adder and an output for providing the sum of the negative value on its first input with the value on its second input;

a fifth adder having a first input connected to the output of said second adder, a second input connected to the output of said second storage register with the bits thereof shifted one place thereby effecting a multiplication by 2 of the contents of said second storage register, and an output for providing the sum of the values on its first and the second inputs;

fifth and sixth delay registers connected in series, said fifth delay register having an input connected to the output of said fifth adder, and said sixth delay register having an output;

a sixth adder having a first input connected to the output of said input register, a second input connected to the output of said fourth storage register, and an output for providing the sum of the values on its first and second inputs;

a seventh delay register having an input connected to the output of said sixth adder and an output;

a seventh adder having a first input connected to the output of said sixth adder, a second input connected to the output of said seventh delay register, and an output for providing the sum of the values on its first and second inputs;

an eighth delay register having an input connected to the output of said seventh adder and an output;

a ninth delay register having an input connected to the output of said eighth delay register and an output;

an eighth adder having a first input connected to the output of said eighth delay register and a second input connected to the output of said ninth delay register and an output for providing the sum of the values on its first and second inputs;

a ninth adder having a first input connected to the output of said sixth delay register with the bits thereof shifted two places thereby effecting a multiplication by 4 of the contents of said sixth delay register, a second input connected to the output of said eighth adder, and an output for providing the sum of the value on its first input and the negative value on its second input;

a tenth adder having a first input connected to the output of said fourth adder, a second input connected to the output of said ninth adder, and an output for providing the sum of the values on its first and second inputs; and bit shifting means for providing all but the four low order bits of the output of said tenth adder thereby effecting a division of the value output by said tenth adder by 16, thereby providing an enhanced value of the center element of said submatrix.

* * * * *